US008620751B2

(12) United States Patent
Karidi et al.

(10) Patent No.: US 8,620,751 B2
(45) Date of Patent: Dec. 31, 2013

(54) FACILITATING ADVERTISEMENT SELECTION USING ADVANCEMENT BIDS

(75) Inventors: Ron Jack Karidi, Herzeliya (IL); Moshe Tennenholtz, Haifa (IL)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 12/704,304

(22) Filed: Feb. 11, 2010

(65) Prior Publication Data

US 2011/0196747 A1    Aug. 11, 2011

(51) Int. Cl.
*G06Q 30/00*    (2012.01)
*G05B 19/418*    (2006.01)

(52) U.S. Cl.
USPC .............................. 705/14.71; 707/999.001

(58) Field of Classification Search
USPC .............................................. 707/1, 999.001
See application file for complete search history.

(56) References Cited

U.S. PATENT DOCUMENTS

| 2002/0165849 | A1* | 11/2002 | Singh et al. ................... 707/1 |
| 2004/0103024 | A1* | 5/2004 | Patel et al. ..................... 705/14 |
| 2005/0097204 | A1 | 5/2005 | Horowitz |
| 2006/0095336 | A1 | 5/2006 | Heckerman |
| 2006/0242017 | A1 | 10/2006 | Libes |
| 2007/0073579 | A1 | 3/2007 | Immorlica |
| 2007/0174114 | A1* | 7/2007 | Bigby et al. ................... 705/14 |
| 2008/0103895 | A1 | 5/2008 | Burdick |
| 2008/0154797 | A1 | 6/2008 | Choul won |
| 2008/0275757 | A1* | 11/2008 | Sharma et al. ................ 705/10 |
| 2009/0099909 | A1 | 4/2009 | Phan |
| 2009/0132334 | A1 | 5/2009 | Wang |
| 2011/0225042 | A1* | 9/2011 | Cetin ......................... 705/14.52 |

FOREIGN PATENT DOCUMENTS

| JP | 2008257728 | 10/2008 |
| KR | 1020060004711 | 1/2008 |
| KR | 1020090000080 | 1/2009 |

OTHER PUBLICATIONS

Microsoft Acquires Massive. May 5, 2006. FinancialWire.*
PCT International Search Report, mailed Aug. 25, 2011, in U.S. Appl. No. 12/704,304, 9 pp.
"Contextual Advertising," retrieval date Dec. 7, 2009, http://www.advmediaproductions.com/contextual-advertising.html.

* cited by examiner

*Primary Examiner* — Victoria Vanderhorst
(74) *Attorney, Agent, or Firm* — Shook, Hardy & Bacon L.L.P.

(57) ABSTRACT

Systems, methods, and computer storage media having computer-executable instructions embodied thereon that facilitate advertisement selection using advancement bids. In embodiments, advertisement attributes in association with an advertisement are referenced. Such advertisement attributes might include an impression bid and a click bid. For a particular advertisement, it is determined if a satisfactory click rate is available. If it is determined that the satisfactory click rate is unavailable for the advertisement, an impression bid is utilized to compete with other advertisements in an advertisement-selection auction. On the other hand, if it is determined that the satisfactory click rate is available for the advertisement, the satisfactory click rate and the click bid are utilized (e.g., via an effective impression value) to compete with the other advertisements in the advertisement-selection auction.

20 Claims, 7 Drawing Sheets

FACILITATING ADVERTISEMENT SELECTION USING ADVANCEMENT BIDS

BACKGROUND

Advertisements are generally selected for display in association with a website using a cost-per-click (CCP) or pay-per-click (PPC) advertisement program. In such cases, an advertiser provides a CCP bid or a PPC bid for an advertisement that is used along with a click-through-rate (CTR) associated with the advertisement to select an advertisement for display.

Oftentimes, however, a click-through-rate associated with a particular advertisement is unavailable or inaccurate. For instance, a click-through-rate for an advertisement might be unavailable when the advertisement has not been previously displayed. Even if a click-through-rate for a particular advertisement can be estimated using initial displays of the advertisement, such a click-through-rate is generally inaccurate based on the limited frequency of display instances.

Unavailable and/or inaccurate click-through-rates can result in an improper advertisement selection. For example, an estimated click-through-rate for an advertisement that has been previously displayed only a few times might be inaccurate and relatively low. Assuming a particular system uses click-through-rates and CCP bids to select advertisements for display, such an advertisement may not be selected due to the inaccurately estimated click-through-rate even though the advertisement might be associated with a high CCP bid.

Further, in some cases, display of an advertisement might be limited until a satisfactory click-through-rate is obtained. By way of example only, an advertisement for which a satisfactory click-through-rate is unavailable might be restricted from participating in an advertisement auction, for example, using a CCP bid and a click-through-rate to select advertisements. In this regard, an advertisement might only be displayed in accordance with selection of the advertisement from among a set of advertisements for which a satisfactory click-through-rate is yet to be determined. Even if an advertisement with an unsatisfactory click-through-rate is permitted to participate in an advertisement auction, an inaccurately estimated click-through-rate can be detrimental to selection of the advertisement for display. Such limited display opportunities for an advertisement can delay an accurate estimation of a click-through-rate for the advertisement and/or hinder selection of the advertisement to be displayed thereby resulting in an economic and a promotional impact to the advertiser.

SUMMARY

Embodiments of the present invention relate to systems, methods, and computer-readable media for, among other things, facilitating advertisement selection using advancement bids. An advancement bid refers to a bid that is utilized in an effort to advance selection of an advertisement for display. Utilizing an advancement bid, such as an impression bid or an experimentation bid, promotes recognition or identification of a satisfactory click rate that may otherwise be delayed due to a minimal frequency of advertisement displays. As such, an advertisement can obtain a satisfactory click rate in a timely manner and thereby effectively participate in an advertisement-selection auction used to select advertisements for display. In implementation, an experimentation bid can be used to increase a likelihood that a particular advertisement will be selected for display from among a set of advertisements that do not have a satisfactory click rate available. Additionally or alternatively, an impression bid can be used as an alternative to using an estimated click rate and a click bid (e.g., via an effective impression value) to compete in an advertisement-selection auction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer storage media having computer-executable instructions embodied thereon that facilitate selecting an advertisement using advancement bids, such as an impression bid and/or an experimentation bid. An advancement bid is a bid that is utilized in an effort to advance selection of an advertisement for display. In this regard, an advancement bid promotes recognition or identification of a satisfactory click rate and/or promotes advertisement display opportunities. In embodiments, an advancement bid includes an impression bid and/or an experimentation bid. An impression bid, as used herein, refers to a bid input by an advertiser that identifies an amount the advertiser is willing to pay for each instance or set of instances (e.g., 1,000) that an advertisement is displayed and/or viewed. An impression bid might be a cost per (thousand) impression(s). An experimentation bid, as used herein, refers to a bid input by an advertiser that identifies an amount the advertiser is willing to devote to experimental displays of an advertisement (e.g., advertisement displays used to determine a satisfactory click rate). As used herein, an advertisement refers to any visual and/or audio advertisement.

Using an advancement bid enables an advertiser to impact estimation of a click rate in association with an advertisement. In this regard, advertisers can utilize advancement bids to influence selection of an advertisement that does not have a satisfactory click rate (i.e., a satisfactory click rate is unavailable). Accordingly, an advertiser can provide an advancement bid(s) that can be used to advance an estimation or determination of a satisfactory click rate so that an advertisement can participate in an advertisement auction with a satisfactory click rate.

A click rate for an advertisement refers to a rate or probability at which a displayed advertisement is clicked or selected by a user(s). A click rate might be a click-through-rate (CTR) for an advertisement (i.e., the number of instances an advertisement is clicked over the number of instances an advertisement is displayed and/or viewed). An unsatisfactory click rate refers to a click rate that is unavailable or that is, or would be, insufficiently or inaccurately estimated, predicted, or calculated. In embodiments, a click rate might be estimated based on data from instances the advertisement has been previously displayed. The advertisement, however, might not have been displayed frequent enough to obtain an estimated click rate with a high confidence. That is, the sample size might be too small to detect a sufficient or accurate click rate. In this regard, an unsatisfactory click rate might be a click rate that failed to exceed a level or threshold of accuracy, or confidence thereof, for example, based on frequency of advertisement impressions, frequency of advertisement selections, length of time during which advertisements are displayed, duration of advertisement impressions, or the like. For instance, an estimated click rate might be designated as unsatisfactory if the corresponding advertisement has been displayed less than a predetermined number of times (e.g., 1000 displays) or fails to achieve a predetermined confidence level.

As can be appreciated, an unsatisfactory click rate can be identified as such if a click rate would be inaccurate or insufficient if calculated. That is, even if a click rate has not yet been calculated for an advertisement, the advertisement can be associated with an unsatisfactory click rate, for example, if other indicators suggest that a click rate would be insufficient or inaccurate if calculated. Indicators that might suggest an unsatisfactory click rate include, by way of example and not limitation, frequency of advertisement displays, frequency of clicks, and the like.

In some cases, an unsatisfactory click rate is an unknown or unidentified click rate. An unknown or unidentified click rate refers to a click rate that has not been initially estimated or calculated. Such an unknown or unidentified click rate might exist for any number of reasons. For example, an advertisement might not have been previously displayed thereby resulting in a lack of data that can be used to estimate a click rate. Alternatively, a display of an advertisement might have been displayed with limited frequency or recently displayed such that a click rate has not yet been estimated.

Conversely, a satisfactory click rate refers to a sufficient click rate that is available. As such, a satisfactory click rate is a click rate that is determined or identified to be sufficiently accurate and available. In this regard, the click rate might exceed a threshold of accuracy, or confidence thereof, based on, for example, frequency of advertisement impressions, frequency of advertisement selections, length of time during which advertisements are displayed, duration of advertisement impressions, or the like. For instance, an estimated click rate might be designated as satisfactory if the corresponding advertisement has been displayed more than a predetermined number of times (e.g., 1000 displays) or achieves a predetermined confidence level.

By way of example only, assume that a new or recent advertisement is entered into an advertisement auction in which advertisements generally compete to be selected for display based on a click bid and a click rate. A click bid for an advertisement is a bid input by an advertiser that identifies a monetary amount the advertiser is willing to pay for each instance or set of instances the advertisement is clicked or selected by a user. A click bid might be a cost-per-click (CPC) bid or a pay-per-click (PPC) bid. Further assume that because the advertisement is new or recent, a satisfactory click rate is unavailable for the advertisement (e.g., a click rate has not yet been estimated or an estimated click rate is insufficient). In such a case, an advertiser can provide an impression bid to promote selection of the advertisement for display. That is, rather than permitting the advertisement selection system to utilize an unsatisfactory click rate, which can result in minimal selection of the advertisement for display, the advertiser can input an impression bid that can be used to compete in the advertisement auction.

By way of further example, assume that a new or recent advertisement for which a satisfactory click rate is unavailable is entered into an advertisement selection system. Further assume that because an unsatisfactory click rate exists for the advertisement, the advertisement is included in an experimentation pool to enable selection of the advertisement despite the unavailability of a satisfactory click rate. In such a case, an advertiser can provide an experimentation bid to influence selection of the advertisement for display. In this regard, rather than allowing the advertisement selection system to select an advertisement for display without any influence from the advertiser (e.g., a random selection or a systematic selection from the experimentation pool), the advertiser can input an experimentation bid that can be used to promote selection of the advertisement in association with an experimentation display (e.g., display of an advertisement selected from a set of advertisements having unsatisfactory click rates so that satisfactory click rates can be estimated).

Accordingly, in one aspect, the present invention is directed to one or more computer storage media having computer-executable instructions embodied thereon, that when executed, cause a computing device to perform a method for facilitating advertisement selection using impression bids when satisfactory click rates are unavailable. The method includes referencing a set of advertisement attributes in association with an advertisement, the set of advertisement attributes including at least an impression bid provided by an advertiser that indicates an acceptable amount to pay for displays of the advertisement and a click bid provided by the advertiser that indicates an acceptable amount to pay for one or more user selections of the advertisement. The method also includes determining if a satisfactory click rate is available for the advertisement, the satisfactory click rate being available when accuracy of an estimated click rate for the advertisement exceeds a threshold. If it is determined that the satisfactory click rate is unavailable for the advertisement, the impression bid is utilized to compete with other advertisements in an advertisement-selection auction. On the other hand, if it is determined that the satisfactory click rate is available for the advertisement, the satisfactory click rate and the click bid are utilized to compete with the other advertisements in the advertisement-selection auction.

In another aspect, the present invention is directed one or more computer storage media having computer-executable instructions embodied thereon, that when executed, cause a computing device to perform a method for facilitating advertisement selection using experimentation bids when satisfactory click rates are unavailable. The method includes referencing a set of advertisement attributes for each advertisement within an experimentation pool. The set of advertisement attributes including at least an experimentation bid provided by an advertiser that indicates an acceptable amount to pay for displays of the advertisement included within an experimentation pool. For each advertisement, a probability that the advertisement will be selected from the experimentation pool to be displayed to a user is determined based on the experimentation bid for each advertisement and a totality of experimentation bids provided for each advertisement within the experimentation pool. An advertisement is selected for display from the experimentation pool in accordance with the determined probabilities that the advertisement will be selected from the experimentation pool to be displayed.

In yet another aspect, embodiments of the present invention is directed to a computerized method for facilitating advertisement selection using advancement bids. The method includes referencing a set of advertisement attributes associated with an advertisement within an auction pool. The auction pool includes advertisements associated with satisfactory click rates and advertisements associated with unsatisfactory click rates. The set of advertisement attributes includes an impression bid provided by an advertiser that indicates an acceptable amount to pay for one or more displays of the advertisement and an effective impression value that indicates a monetary value associated with a set of one or more impressions of the advertisement.

The method also includes determining if the impression bid or the effective impression value is greater. If the impression bid is greater, the impression bid is designated for use in an advertisement-selection auction. If, however, the effective impression value is greater, the effective impression value is designated for use in the advertisement-selection auction. The designated impression bid or the effective impression bid for the advertisement is compared with impression bids or effective impression bids designated for other advertisements within the auction pool. An advertisement within the auction pool is selected for presentation to a user, and the selected advertisement is displayed.

Having briefly described an overview of the present invention, an exemplary operating environment in which various aspects of the present invention may be implemented is described below in order to provide a general context for various aspects of the present invention. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
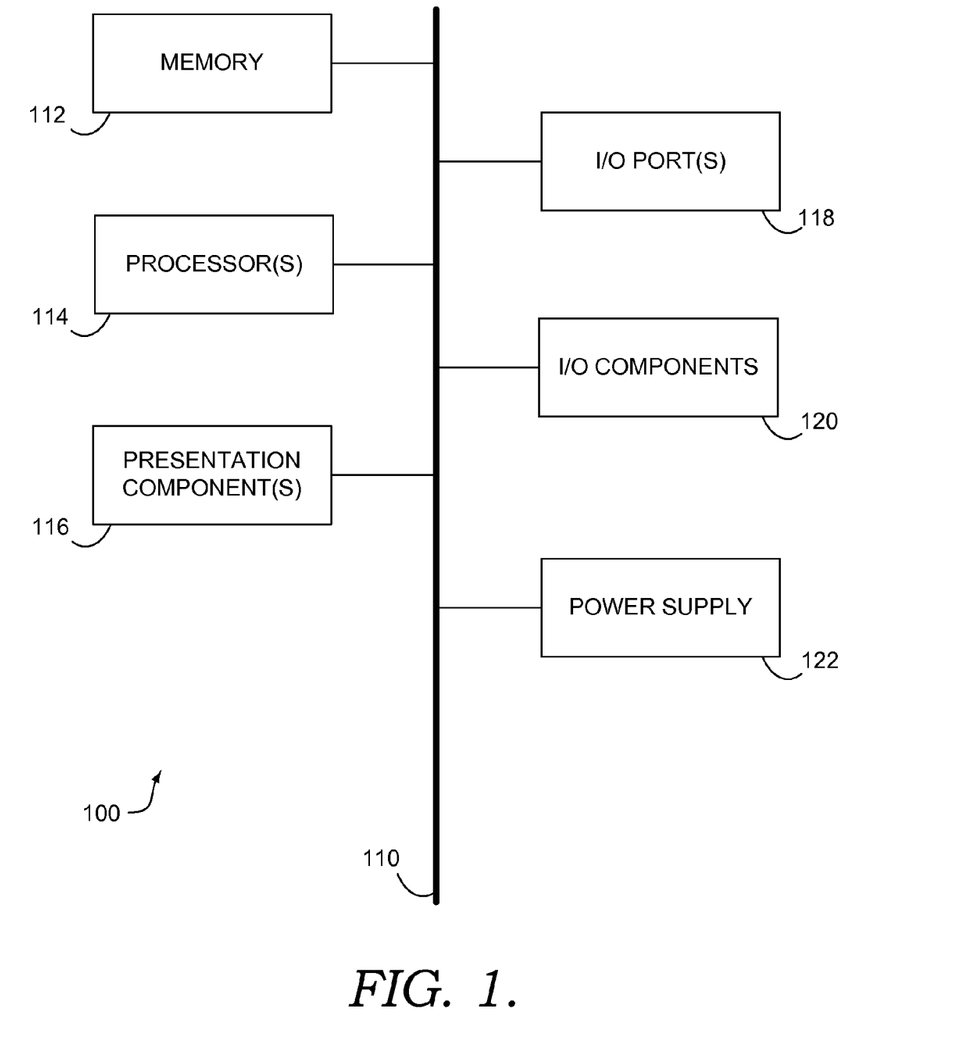
FIG. 1 is a block diagram of an exemplary computing environment suitable for use in implementing embodiments of the present invention.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognizes that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
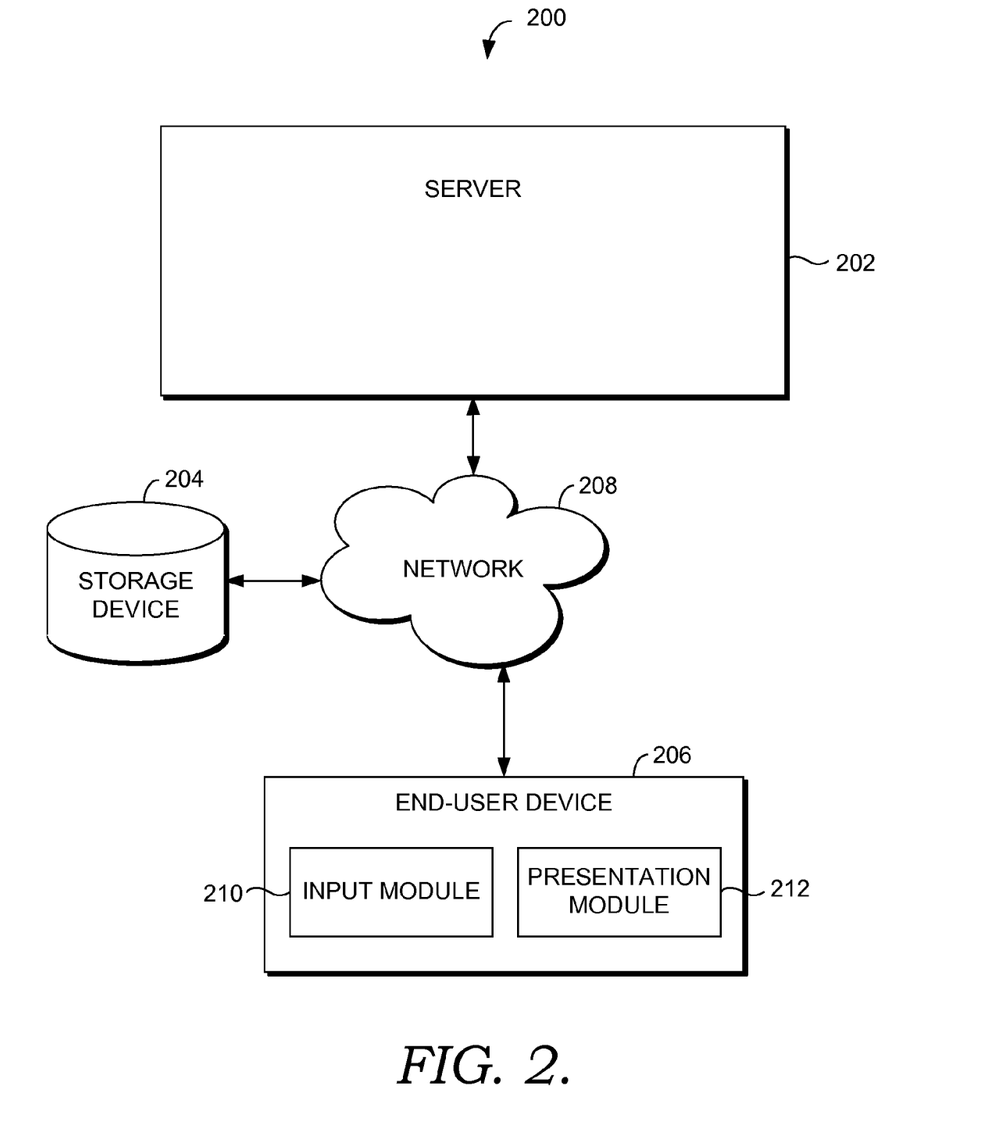
FIG. 2 is a block diagram of an exemplary computing system architecture suitable for use in implementing embodiments of the present invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

Computing system architecture 200 includes a server 202, a storage device 204, and an end-user device 206, all in communication with one another via a network 208. The network 208 may include, without limitation, one or more local area networks (LANs) and/or wide area networks (WANs). Such networking environments are commonplace in offices, enterprise-wide computer networks, intranets and the Internet. Accordingly, the network 208 is not further described herein.

The storage device 204 is configured to store information associated with advertisement selection. In various embodiments, such information may include, without limitation, advertisements, click rates, click bids, impression bids, experimentation bids, impressions, effective impression values, click numbers, and/or the like. In embodiments, the storage device 204 is configured to be searchable for one or more of the items stored in association therewith. It will be understood and appreciated by those of ordinary skill in the art that the information stored in association with the storage device 204 may be configurable and may include any information relevant to one or more advertisements, click rates, click bids, impression bids, experimentation bids, impressions, effective impression values, click numbers, and/or the like. The content and volume of such information are not intended to limit the scope of embodiments of the present invention in any way. Further, though illustrated as a single, independent component, the storage device 204 may, in fact, be a plurality of storage devices, for instance a database cluster, portions of which may reside on the server 202, the end-user device 206, another external computing device (not shown), and/or any combination thereof.

Each of the server 202 and the end-user device 206 shown in FIG. 2 may be any type of computing device, such as, for example, computing device 100 described above with reference to FIG. 1. By way of example only and not limitation, each of the server 202 and the end-user device 206 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The server 202 may include any type of application server, database server, or file server configurable to perform the methods described herein. In addition, the server 202 may be a dedicated or shared server. One example, without limitation, of a server that is configurable to operate as the server 202 is a structured query language ("SQL") server executing server software such as SQL Server 2005, which was developed by the Microsoft® Corporation headquartered in Redmond, Wash.

Components of server 202 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via a network, e.g., network 208. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 200 is merely exemplary. While the server 202 is illustrated as a single unit, one skilled in the art will appreciate that the server 202 is scalable. For example, the server 202 may in actuality include a plurality of servers in communication with one another. Moreover, the storage device 204 may be included within the server 202 or end-user device 206 as a computer-storage medium. The single unit depictions are meant for clarity, not to limit the scope of embodiments in any form.

As shown in FIG. 2, the end-user device 206 includes an input module 210 and a presentation module 212. In some embodiments, one or both of the modules 210 and 212 may be implemented as stand-alone applications. In other embodiments, one or both of the modules 210 and 212 may be integrated directly into the operating system of the end-user device 206. It will be understood by those of ordinary skill in the art that the modules 210 and 212 illustrated in FIG. 2 are exemplary in nature and in number and should not be construed as limiting. Any number of modules may be employed to achieve the desired functionality within the scope of embodiments hereof. An end-user device might be used by a user and/or an advertiser. A user refers to an individual or a group that views an advertisement. Accordingly, a user might navigate to a website, provide a user search query, or the like. An advertiser refers to any entity, such as an individual, partnership, corporation, etc., that supports or promotes an advertisement.

The input module 210 is configured for receiving input. Such input might include, for example, search queries or website navigation provided by users, click bids provided by an advertiser, impression bids provided by an advertiser, experimentation bids provided by an advertiser, or the like. Typically, input is input via a user interface (not shown) associated with the end-user device 206, or the like. Upon receiving input, the presentation module 212 of the end-user device 206 is configured for presenting advertisements, for example, in association with search results or a webpage to a user, and/or presenting a display for receiving advertiser input, for example, such as an experimentation bid, a click bid, and/or an impression bid. Embodiments are not intended to be limited to visual display but rather may also include audio presentation, combined audio/video presentation, and the like.

Figure 3:
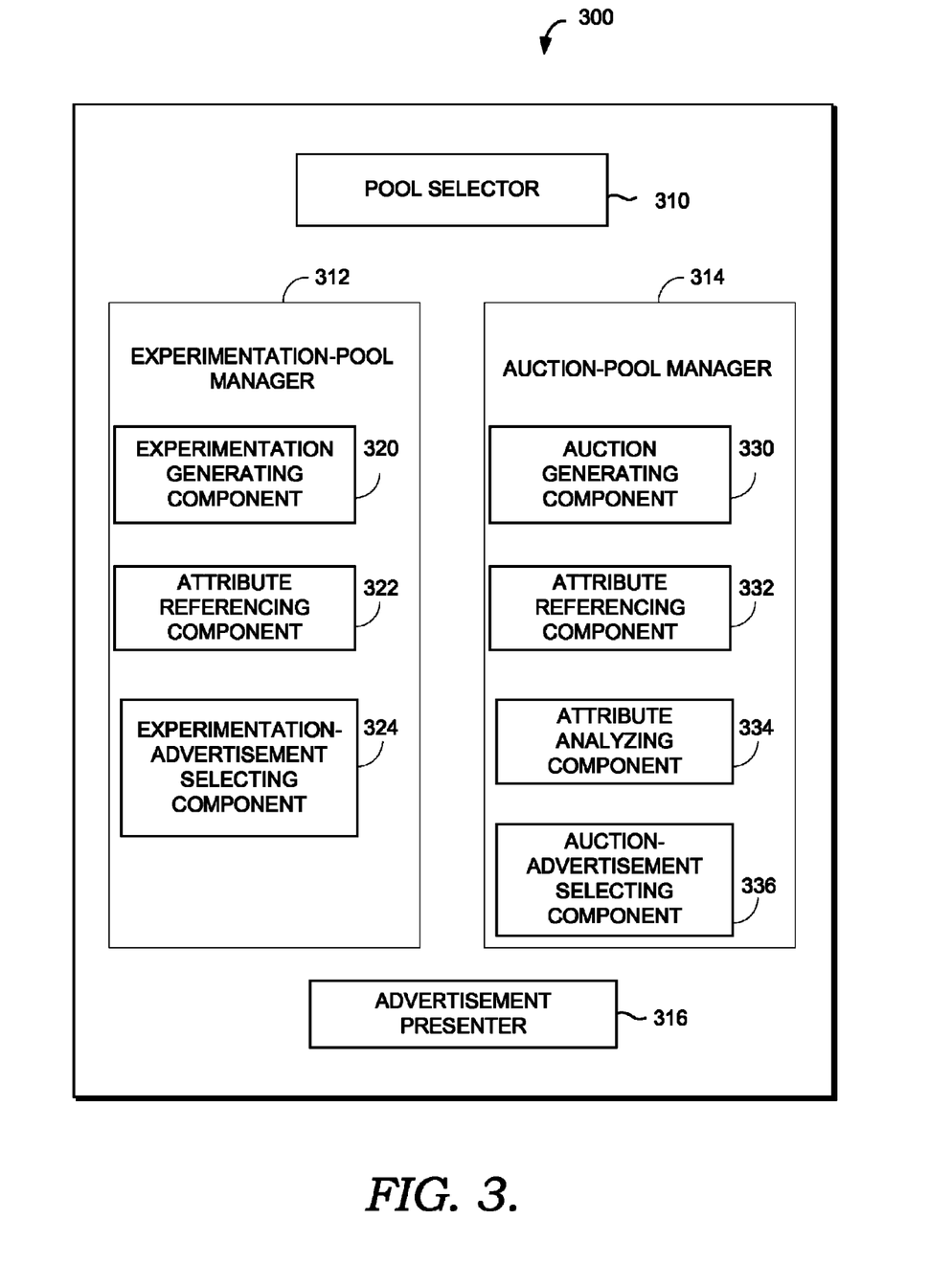
FIG. 3 is a block diagram of an exemplary computer system for use in implementing embodiments of the present invention.

FIG. 3 illustrates an exemplary computing system 300 for facilitating advertisement selection using advancement bids. As shown in FIG. 3, an exemplary computing system 300 includes a pool selector 310, an experimentation-pool manager 312, an auction-pool manager 314, and an advertisement presenter 316. In some embodiments, one or more of the illustrated modules/components may be implemented as stand-alone applications. In other embodiments, one or more of the illustrated modules/components may be integrated directly into the operating system of the server 202, a cluster of servers (not shown) and/or the end-user device 206. It will be understood by those of ordinary skill in the art that the modules/components illustrated in FIG. 3 are exemplary in nature and in number and should not be construed as limiting. Any number of modules and/or components may be employed to achieve the desired functionality within the scope of embodiments hereof. Further, modules and/or components may be located on any number of servers or computing devices. By way of example only, the advertisement presenter 316 and might reside on a server, cluster of servers, or end-user device remote from one or more of the remaining modules/components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other modules and/or components, and in any suitable combination and location. Various functions described herein as being performed by one or more entities may be carried out by hardware, firmware, and/or software. For instance, various functions may be carried out by a processor executing instructions stored in memory.

The pool selector 310 is configured to select a pool from which an advertisement is to be selected for display. In embodiments, a pool is selected upon recognizing that an advertisement is requested for display. An advertisement might be requested for display, for example, in association with a search results webpage (e.g., Microsoft's Bing Search Engine) or other webpage. By way of example only, assume that a user enters a search query into a search engine or navigates to a particular webpage. Further assume that the search results page or the webpage to be displayed to the user requires or requests an advertisement to be displayed, for example, in association with other content being displayed (e.g., search results or webpage content). In such a case, an advertisement is desired or requested so that the advertisement can be displayed in association with the corresponding webpage.

A pool from which an advertisement is selected might be, for example, an experimentation pool or an auction pool. An experimentation pool refers to a set of one or more advertisements from which a particular advertisement is selected for display in association with an experimentation instance. An experimentation instance refers to an occasion on which an experimentation pool is utilized to select an advertisement for display so that data (e.g., click numbers, impression numbers, etc.) in association with a click rate can be obtained and used to determine a click rate (e.g., a satisfactory click rate) for the advertisement selected from the experimentation pool.

By way of example only, assume that an advertiser places an advertisement into an advertising selection system, such as computing system 300, so that such an advertisement will be displayed, for example, within a search results page or other webpage. Because the advertisement has yet to be displayed, the advertisement does not have a satisfactory click rate available. As such, the advertisement will be included in the experimentation pool so that data can be gathered regarding the click rate of the advertisement.

In some embodiments, an experimentation pool includes a set of advertisements for which a satisfactory click rate is unavailable (i.e. yet to be established). In this regard, data in association with a click rate (e.g., click numbers, impression numbers, etc.) are being gathered for advertisements included within an experimentation pool. As such, an experimentation pool might include advertisements having an unsatisfactory click rate, such as an unavailable click rate or an inaccurate click rate. As can be recognized, because the experimentation pool includes advertisements for which a satisfactory click rate is unavailable, advertisements are selected from the experimentation pool based on advertisement attributes other than a click rate, such as an experimentation bid.

An advertisement might remain in an experimentation pool for any length of time, such as, for example, until a satisfactory click rate is available. That is, an advertisement might be included within an experimentation pool until a click rate is estimated or established that attains a threshold or certain level of confidence or accuracy, for example, based on frequency of advertisement displays or period of time during which an advertisement is displayed. Accordingly, the experimentation pool enables an advertisement to be displayed until a satisfactory click rate is determined.

An auction pool refers to a set of one or more advertisements from which a particular advertisement is selected for display in association with an auction instance. An auction instance refers to an occasion on which an auction pool is utilized to select an advertisement for display based on an auction competition between the advertisements. Accordingly, an auction pool includes a set of advertisements that are competing in an auction to display a particular advertisement.

As such, an auction pool might include advertisements having a satisfactory click rate, that is, a sufficiently known or established click rate, as well as advertisements having an unsatisfactory click rate (e.g., unavailable or insufficient click rate). In this regard, a number of advertisements within an auction pool might have a satisfactory click rate, while a number of advertisements within the auction pool might have an unsatisfactory click rate. As previously discussed, advertisements with a satisfactory click rate might be competing in an auction with advertisements having an unsatisfactory click rate.

In an advertisement auction, an advertisement might be selected for display from an auction pool, for example, based on a click bid (i.e., CPC bid or PPC bid) and a click rate (i.e., a CTR). As previously mentioned, a click bid is a bid input by an advertiser that identifies an amount the advertiser is willing to pay for each instance or set of instances the advertisement is clicked by a user. By way of example only, assume an advertiser inputs a click bid such that the advertisement can be displayed in association with webpage content. Further assume that because the advertisement has only been displayed in a few instances, a low and/or inaccurate click rate for the advertisement is initially estimated. The click bid and the click rate can be used to select an advertisement, for example by calculating an effective impression value (e.g., a cost per (e.g., 10,000) impression(s) (CPM)). An effective impression value, as used herein, refers to a cost or value (e.g. monetary value) associated with an impression or set of impressions (e.g., 10,000 impressions) of an advertisement. In embodiments, an effective impression value is calculated using a click bid and a click rate (e.g., an estimated click rate). In this regard, an effective impression value indicates a monetary amount effectively being paid or to be paid for a set of one or more impressions of an advertisement. Subsequently, when an advertisement is requested for display in association with a website, the effective impression value can be compared to other effective impression values of corresponding advertisements within an auction pool to select an advertisement for display. In cases where unsatisfactory click rates are used (e.g., via an effective impression value) to compete in an advertisement selection auction, the resulting advertisement selection might be improper. In this regard, the low and/or inaccurate click rate initially determined for the particular advertisement can result in a high effective impression value and, as such, the advertisement might not be selected for display based on a comparison to other advertisement impression costs within the auction. As can be appreciated, in cases where an unsatisfactory click rate exists and an impression bid is used in place of an effective impression value, an advertisement with an unsatisfactory click rate has an opportunity to compete for display.

An advertisement might join an auction pool at any time, such as, upon an advertiser entering an advertisement into an advertisement selection system. An advertisement might remain in an auction pool for any length of time, such as, for example, until designated by an advertiser, upon expiration of a time or time period, upon reduction of a budget allocated for advertisement display, or the like.

As can be appreciated, an advertisement can be included within the experimentation pool and/or the auction pool. In instances that an advertisement is included within both an experimentation pool and an auction pool, the advertisement might have an opportunity to be selected for display when an experimentation pool is selected and when an auction pool is selected. Alternatively, an advertisement might be included within only one pool at a time. By way of example only, an advertisement might initially be included in an experimentation pool such that data pertaining to a click rate can be obtained. As soon as a satisfactory click rate is obtained or determined for the advertisement, the advertisement might be removed from the experimentation pool and added to the auction pool. Although both an experimentation pool and an auction pool are described herein, in some embodiments, an advertisement selection system may only include a single pool.

The pool selector 310 might select a pool (e.g., an experimentation pool or an auction pool) using any method. In one embodiment, a pool from which to select an advertisement might be selected randomly. In another embodiment, a pool from which to select an advertisement might be identified based on a predetermined algorithm. For example, a particular pool might be selected based on a portion or percent that the particular pool is desired to be utilized to select an advertisement. By way of example only, assume that the experimentation pool is desired to be utilized twenty percent of the time for selecting an advertisement for display. Further assume that an advertisement is desired for display. In such a case, the experimentation pool is utilized one out of five times to select an advertisement for display.

The experimentation-pool manager 312 is configured to manage the experimentation pool. In embodiments, the experimentation-pool manager includes an experimentation generating component 320, an attribute referencing component 322, and an experimentation-advertisement selecting component 324. An experimentation generating component 320 is configured to generate an experimentation pool. As used herein, generating an experimentation pool includes an initial creation of a pool and/or applying any modifications to the experimentation pool. In some cases, an experimentation pool might be generated each instance that an advertisement is requested and/or the experimentation pool is chosen for selecting an advertisement. In other cases, an experimentation pool might be generated upon an occurrence of an event. In such a case, an experimentation pool from which an advertisement is selected for display might be initially generated and, thereafter, modified based on an occurrence of an event (e.g., a lapse of a time period, modification of an advertisement attribute(s), a new advertisement joining the experimentation pool, an advertisement for which a satisfactory click rate is determined, or the like).

In generating an experimentation pool, an advertisement might be included within an experimentation pool using any method. In one embodiment, an experimentation pool includes all available advertisements intended to participate in an experimentation instance(s). In this regard, in one embodiment, the experimentation pool includes any advertisement in association with an unsatisfactory click rate. Alternatively, an experimentation pool includes any advertisement in association with an unsatisfactory click rate and an experimentation bid.

In another embodiment, an experimentation pool might include advertisements related to the webpage content of which a selected advertisement is to be displayed. For example, an experimentation pool might include advertisements intended to participate in an experimentation instance(s) that are relevant to the content of the website that the advertisement is being displayed in association therewith (e.g., a search query or website content being displayed). In this regard, in one embodiment, the experimentation pool includes advertisements associated with unsatisfactory click rates that are related or relevant to the context in which the advertisement is to be displayed. In such a case, the experimentation pool might dynamically change with each request for an advertisement. As such, an experimentation pool is generated or modified each instance an advertisement is requested so that advertisements relevant to the context in which it will be displayed are included in the experimentation pool. As can be appreciated, in some embodiments, the experimentation pool can include all advertisements intended to participate in an experimentation instance(s) and, thereafter, the relevant advertisements can be identified and utilized.

In some cases, an advertisement selection system might include multiple experimentation pools. For example, one experimentation pool might include available advertisements intended to participate in an experimentation instance(s) that are not associated with experimentation bid while another experimentation pool includes available advertisements intended to participate in an experimentation instance(s) that are associated with experimentation bids. In such a case, a particular pool might be selected using any method, such as, for example, randomly selected, selected based on a portion or percent that a particular pool is desired to be used to select an advertisement, or the like.

The attribute referencing component 322 is configured to reference a set of one or more advertisement attributes in association with advertisements. An advertisement attribute refers to any attribute that is or can be utilized to select an advertisement for display. By way of example and not limitation, an advertisement attribute might be an experimentation bid, a click rate, a click bid, an impression bid, an impression number, a click number, an effective impression value, or the like. In embodiments, advertisement attributes are stored in association with the corresponding advertisement, or identifier thereof, in a data store, such as storage device 204 of FIG. 2.

An advertisement attribute(s) might be provided by an advertiser. For example, an advertiser might input or select an experimentation bid, a click bid, and/or an impression number. Alternatively, an advertisement attribute might be identified or determined based on data captured, for example, in response to displaying an advertisement. For instance, upon displaying a particular advertisement, an impression number and a click number can be captured and a click rate can be determined therefrom. Further, a click bid and a click rate can be used to calculate an effective impression value.

In embodiments, the attribute referencing component 322 references experimentation bids associated with advertisements. As previously mentioned, an experimentation bid refers to a bid input by an advertiser that identifies an amount the advertiser is willing to devote to experimental displays of an advertisement. In this regard, in some cases, an advertiser inputs a monetary budget or allocation that is acceptable for using or consuming to display an advertisement selected from an experimentation pool. Such an experimentation bid can influence the probability that an advertisement will be selected from the experimentation pool for display to a user, as discussed more fully below.

The experimentation-advertisement selecting component 324 is configured to select advertisements from experimentation pools for display. Such advertisements can be displayed in association with a set of search results or a webpage. In embodiments, the experimentation-advertisement selecting component 324 uses advertisements within the experimentation pool to select an advertisement(s).

In embodiments, the experimentation-advertisement selecting component 324 utilizes experimentation bids (e.g., referenced experimentation bids) to select an advertisement for display. In some cases, an experimentation bid can be directly used to select an advertisement for display. By way of example, assume that a first advertiser allocates $600 for use in displaying a first advertisement included within an experimentation pool, and a second advertiser allocates $200 for use in displaying a second advertisement included within the experimentation pool. In such a case, the first advertisement might be selected for display based on the higher amount (i.e., $600) of the experimentation bid.

In other cases, an experimentation bid can be indirectly used to select an advertisement for display. In this regard, an experimentation bid can be used to influence selection of a particular advertisement. Generally, a higher experimentation bid provides a greater opportunity for the corresponding advertisement to be selected from an experimentation pool. For example, assume again that a first advertiser allocates $600 for use in displaying a first advertisement within an experimentation pool, and a second advertiser allocates $200 for use in displaying a second advertisement within an experimentation pool. Further assume that an advertisement selection system being utilized randomly selects an advertisement from an experimentation pool to be displayed. Such a method allows an opportunity for any advertisement having an unsatisfactory click rate to be selected for display. The experimentation bids provided by advertisers associated with the advertisements can be utilized to influence the probability or likelihood of selection of an advertisement. That is, because the first advertisement has a larger budget (i.e., $600) than the second advertisement (i.e., $200), the first advertisement might have more representations in the experimentation pool or a greater probability of being selected. In such a case, an experimentation bid affects the likelihood of selection of an advertisement but is not conclusive of the outcome of the selection, whereas, in an auction scenario, an advertisement associated with a highest bid or effective impression value generated therefrom is generally selected for display.

For instance, continuing with the present example, the first advertisement might be represented in the experimentation pool three times while the second advertisement might be represented in the experimentation pool one time. As can be appreciated, a number of representations of an advertisement in an experimentation pool can be determined based on the experimentation bid for an advertisement provided by an advertiser divided by the total amount of experimentation bids provided by all advertisers. In this case, the total amount of experimentation bids provided by all advertisers is $800 (i.e., $600+$200). Therefore, the first experimentation bid of $600 results in three representations or three-fourths of the representations in experimentation pool, while the second experimentation bid of $200 results in one representation or one-fourth of the representations in an experimentation pool. The experimentation-advertisement selecting component 324 can then randomly select an advertisement from an experimentation pool in accordance with the representations of advertisements. Although described herein as a linear probability, experimentation bids can be utilized in any manner to select an advertisement for display. For example, various algorithms, such as a non-linear algorithm, can be used to provide various probabilities or representations for advertisements within an experimentation pool.

As can be appreciated, in some cases, upon selection of a particular advertisement for display, an experimentation bid comprising a budget or allocation is reduced or consumed in accordance with a display of the advertisement. In this regard, each instance that a particular advertisement is selected from the experimentation pool to be displayed, a reduction of the experimentation bid is made for the display of the advertisement. The cost or payment made in response to selection and display of an advertisement can be any value and may vary depending on the advertisement selection system and/or the instance, time duration, display location, etc. of an advertisement. By way of example, and without limitation, an experimentation bid might be reduced by an average effective cost per impression or the most recent cost per impression for a particular display instance.

The auction-pool manager 314 is configured to manage the auction pool. In embodiments, the auction-pool manager includes an auction generating component 330, an attribute referencing component 332, an attribute analyzing component 334. An auction generating component 330 is configured to generate an auction pool. As used herein, generating an auction pool includes an initial creation of a pool and applying any modifications to the pool. In some cases, an auction pool might be generated each instance that an advertisement is requested and/or the auction pool is chosen for selecting an advertisement. In other cases, an auction pool might be generated upon an occurrence of an event (e.g., a lapse of a time period, modification of an advertisement attribute(s), or the like).

In generating an auction pool, an advertisement might be included within an auction pool using any method. In one embodiment, an auction pool includes all available advertisements intended to participate in an advertisement auction competition. In this regard, in one embodiment, the auction pool includes any advertisement in association with a satisfactory click rate as well as any advertisement in association with an unsatisfactory click rate and having an impression bid. In such a case, an auction pool from which an advertisement is selected for display might be initially generated and, thereafter, modified based on an occurrence of an event (e.g., a lapse of a time period), a new advertisement joining the auction pool, an advertisement for which a satisfactory click rate is determined, an advertisement for which an impression bid is provided, or the like.

In another embodiment, an auction pool might include advertisements related to the webpage content of which a selected advertisement is to be displayed. For example, an auction pool might include advertisements intended to participate in an advertisement auction competition that are relevant to the content of the website that the advertisement is being displayed in association therewith (e.g., a search query or website content being displayed). As such, in one embodiment, the auction pool includes advertisements associated with satisfactory click rates and unsatisfactory click rates with an impression bid that are related or relevant to the context in which the advertisement is to be displayed. In such a case, the auction pool might dynamically change with each request for an advertisement. In this regard, an auction pool is generated or modified each instance an advertisement is requested such that advertisements relevant to the context in which it will be displayed are included in the auction pool. As can be appreciated, in some embodiments, the auction pool can include all advertisements intended to participate in an advertisement auction competition and, thereafter, the relevant advertisements can be identified and utilized.

The attribute referencing component 322 is configured to reference a set of one or more advertisement attributes in association with advertisements. As previously mentioned, an advertisement attribute refers to any attribute that is or can be utilized to select an advertisement for display. By way of example and not limitation, an advertisement attribute might be an experimentation bid, a click rate, a click bid, an impression bid, an impression number, a click number, an effective impression value, or the like. In embodiments, advertisement attributes are stored in association with the corresponding advertisement, or identifier thereof, in a data store, such as storage device 204 of FIG. 2.

An advertisement attribute(s) might be provided by an advertiser. For example, an advertiser might input or select an experimentation bid, a click bid, and/or an impression bid. Alternatively, an advertisement attribute might be identified or determined based on data captured, for example, in response to displaying an advertisement. For instance, upon displaying a particular advertisement, an impression number and a click number can be captured and a click rate can be determined therefrom. Thereafter, the click rate and click bid can be used to determine an effective impression value.

In embodiments, the attribute referencing component 332 references impression bids, click rates, and/or effective impression values associated with advertisements. As previously mentioned, an impression bid refers to a bid input by an advertiser that identifies an amount the advertiser is willing to pay for each instance or set of instances that an advertisement is displayed. In this regard, in some embodiments, an advertiser inputs a monetary amount that is acceptable for spending to display an advertisement selected from an auction pool. An impression bid can be used to compete in an advertisement auction, for example, in comparison with other impression bids and effective impression values such that the advertisement can compete for display even though an unsatisfactory click rate exists for that advertisement.

The attribute analyzing component 334 is configured to analyze advertisement attributes to determine an advertisement attribute, such as an impression bid or an effective impression value, to use for competing in an advertisement auction, such as an impression bid or an effective impression value. In embodiments, the attribute analyzing component recognizes or determined whether a satisfactory click rate is available. In cases that a sufficient click rate is available, such a click rate is utilized in association with the advertisement to compete in the advertisement auction. As such, the satisfactory click rate might be used in combination with a click bid to determine an effective impression value that can be utilized to compete against other effective impression values and impression bids for advertisement selection. In this regard, the attribute analyzing component, or another component, might be configured to determine an effective impression value using a satisfactory click rate and a click bid provided by an advertiser.

As can be appreciated, any method can be used to determine whether a satisfactory click rate is available. For example, accuracy of a click rate or a confidence level associated with a click rate can be calculated for an estimated click rate and compared to a predetermined threshold to determine whether a satisfactory click rate is available. Additionally or alternatively, other advertisement attributes can be analyzed to provide an indication as to whether a satisfactory click rate is available. For instance, frequency of advertisement displays and/or frequency of advertisement clicks might be compared to a predetermined threshold to determine if an estimated click rate is satisfactory.

In some cases, an existence of an effective impression value might be recognized. In this scenario, it may be assumed that the effective impression value was calculated using a satisfactory click rate. That is, if an unsatisfactory click rate existed, then an effective impression value would not have been calculated. Upon recognizing that an effective impression value exists, the attribute analyzing component can determine that the effective impression value should be used in competing in an advertisement auction. In cases where an effective impression value does not exist and/or a satisfactory click rate is not available for a particular advertisement, the attribute analyzing component determines that an impression bid provided by an advertiser is to be used to compete in an advertisement auction.

In some embodiments, an impression bid is utilized to compete in an advertisement auction until a satisfactory click rate is estimated that results in an effective impression value that is higher than the impression bid for the advertisement. For example, assume that an advertiser provides a click bid of $1 and a click rate of one click per 100 impressions is estimated. Such an advertisement would compete in an advertisement auction with an effective impression value of one cent (i.e., $1/100). Further assume that the advertiser provided an impression bid of $50 (five cents times 10,000). That is, for each impression, the advertiser is willing to pay five cents. In such a case, until the click rate estimated by the advertisement selection system is higher than five percent, the advertisement will compete in the advertisement auction using the impression bid of five cents per impression rather than the effective impression value of one cent per impression. Upon the click rate attaining greater than five percent, the advertisement would begin competing in the advertisement auction with the effective impression value thereby paying the click bid of $1 each instance the advertisement is selected for display.

Upon determining an advertisement attribute to use for competing in an advertisement auction, the attribute analyzing component 334, or another component, might designate a particular advertisement attribute, such as an impression bid or an effective impression value, as the attribute to utilize to select an advertisement. A designation of a particular advertisement attribute might be stored in association with the advertisement and/or advertisement attributes so that the designated advertisement attribute can be referenced without performing another analysis of one or more advertisement attributes. In such a case, designated advertisement attributes can be referenced and used to select an advertisement for display.

The auction-advertisement selecting component 336 is configured to select advertisements from auction pools for display. Such advertisements can be displayed in association with a set of search results or a webpage. In embodiments, the auction-advertisement selecting component 336 uses advertisements within the auction pool to select an advertisement(s).

In embodiments, the auction-advertisement selecting component 336 utilizes impression bids for advertisements having an unsatisfactory click rate and an effective impression value for advertisements having a satisfactory click rate to select an advertisement for display. Accordingly, impression bids and effective impression value can be compared to one another to select an advertisement for display. Generally, although not by way of limitation, an advertisement associated with a greater or higher impression bid or effective impression value is selected for display. As can be appreciated, an advertisement selection system might also incorporate any number of factors into selecting an advertisement for display.

By way of example only, assume that a first advertisement is a new advertisement and, as such, does not have satisfactory click rate available. Further assume that an advertiser provided an impression bid for the advertisement. In such a case, the impression bid is designated for use in an advertisement auction. Continuing with this example, assume that a second advertisement is established and has a satisfactory click rate available. The click rate is utilized along with a click bid provided by the advertiser to calculate an effective impression value, which is designated for use in an advertisement auction. Accordingly, the impression bid associated with the first advertisement and the effective impression value associated with the second advertisement are compared and used to select an advertisement for display.

An advertisement presenter 316 is configured to present an advertisement in connection with a webpage. As such, the advertisement presenter 316 might present an advertisement in association with a search query, a search results page, a webpage, or the like. In embodiments, the advertisements being presented are paid advertisements. Advertisement presenter 316 might display and/or provide audio output to present one or more advertisements.

Figure 4A:
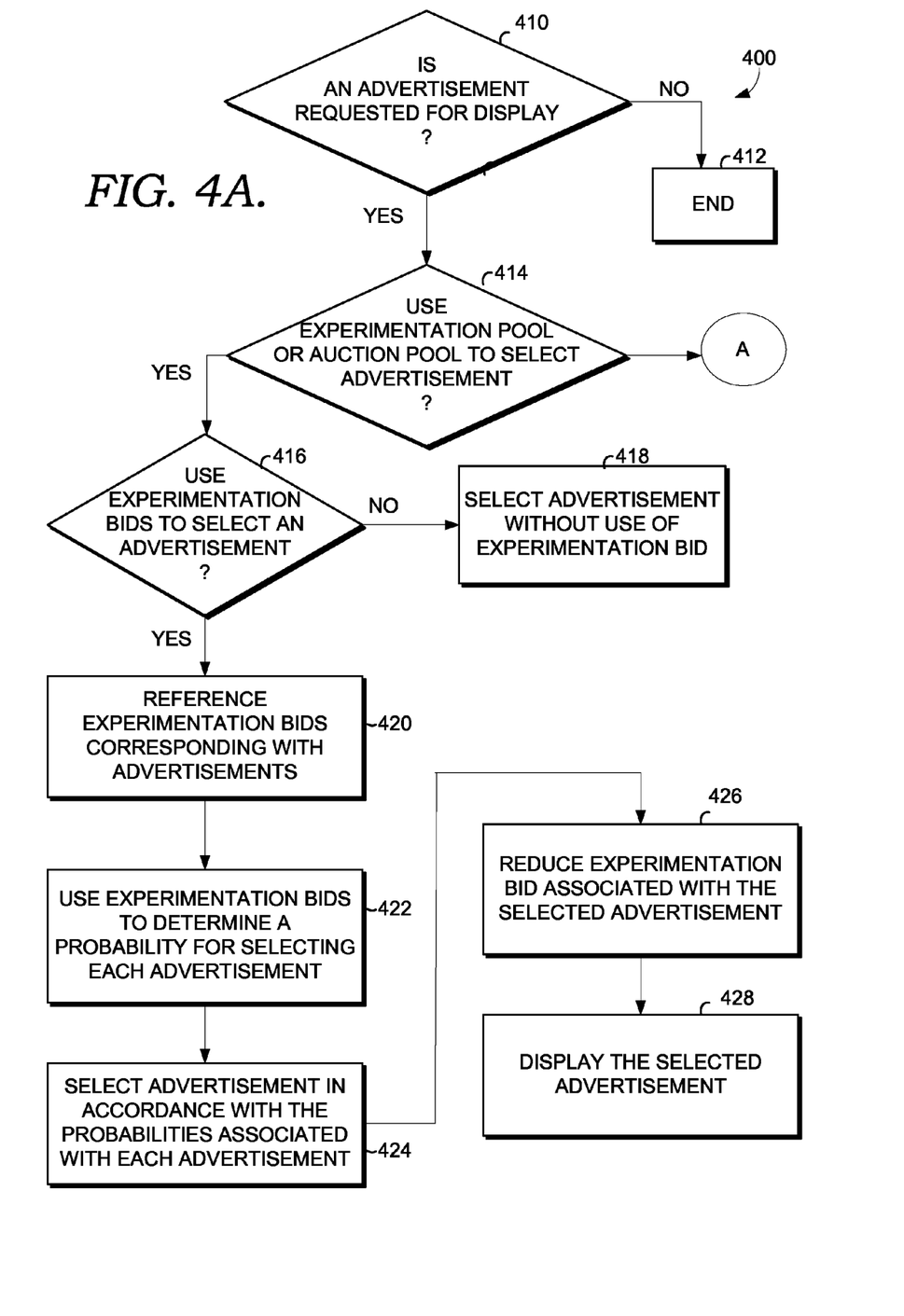
FIG. 4A is a flow diagram showing a method for facilitating advertisement selection using advancement bids, in accordance with an embodiment of the present invention.
Figure 4B:
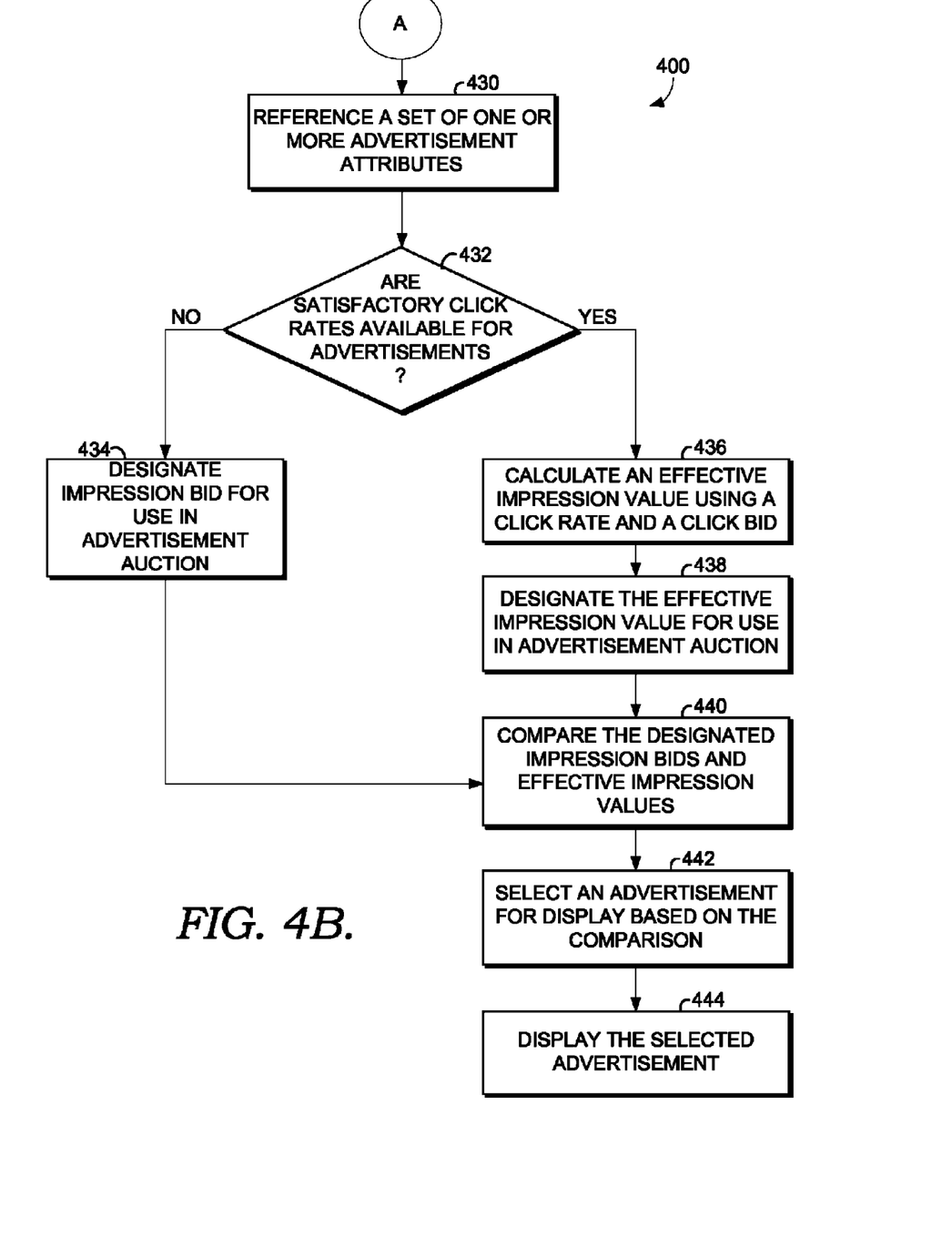
FIG. 4B is a flow diagram continued from FIG. 4A showing a method for facilitating advertisement selection using advancement bids, in accordance with an embodiment of the present invention.

Turning now to FIG. 4A and FIG. 4B, a flow diagram is illustrated which shows a method 400 for facilitating advertisement selection using advancement bids, in accordance with an embodiment of the present invention. Initially, at block 410 of FIG. 4A, it is determined whether an advertisement is requested for display. If it is determined that an advertisement is not required for display, the method ends at block 412. If, on the other hand, it is determined that an advertisement is requested for display, it is determined at block 414 whether to use an experimentation pool or an auction pool to select an advertisement for display. In embodiments, an experimentation pool might be selected a particular portion of the instances while an auction pool might be selected the remaining portion of the instances. If it is determined that an experimentation pool is to be used to select an advertisement for display, it is determined at block 416 whether experimentation bids should be utilized in selecting an advertisement for display. If it is determined that experimentation bids should not be utilized to select an advertisement, at block 418, an advertisement is selected from the experimentation pool without the use of experimentation bids. For example, an advertisement within an experimentation pool might be randomly selected for display with each advertisement in the pool having an equal probability of being selected.

If, however, it is determined that experimentation bids should be utilized to select an advertisement, at block 420, experimentation bids corresponding with advertisements are referenced. The experimentation bids are used to determine a number of representations or a selection probability associated with each advertisement. This is indicated at block 422. In embodiments, a representation quantity or a selection probability is calculated based on the experimentation bid of the advertisement divided by the total amount of experimentation bids of all advertisements. Subsequently, at block 424, an advertisement is selected in accordance with the number of representations or probabilities associated with the respective advertisement. At block 426, the experimentation bid associated with the selected advertisement is reduced to reflect selection of the advertisement for display. At block 428, the selected advertisement is displayed to a user.

Returning to block 414, if it is determined that an auction pool is to be utilized to select an advertisement for display, a set of one or more advertisement attributes are referenced. This is indicated at block 430 of FIG. 4B. At block 432, it is determined if satisfactory click rates are available for advertisements. In embodiments, it might be determined that a satisfactory click rate is available for an advertisement when the estimated click rate exceeds a threshold (e.g., an accuracy or confidence level threshold) and/or another advertisement attribute, such as a click number or impression number, exceeds a predetermined threshold. Comparatively, an unsatisfactory click rate might be identified if an estimated click rate does not exist or if an estimated click rate is insufficient or inaccurate based on a comparison of the click rate, or accuracy or confidence level thereof, or other advertisement attribute to a threshold.

If it is determined that a satisfactory click rate is not available for a particular advertisement, an impression bid provided by an advertiser is designated or identified as being appropriate to use to compete in an advertisement auction, as indicated at block 434. If, on the other hand, it is determined at block 432 that a satisfactory click rate is available for a particular advertisement, the click rate and a click bid provided by an advertiser is used to calculate an effective impression value. This is indicated at block 436. At block 438, the effective impression value is designated as being proper for use to compete in the advertisement auction. Upon designating impression bids or effective impression values for advertisements at block 434 and 436, at block 440, the designated impression bids and effective impression values are compared to one another to compete in the advertisement auction. Thereafter, at block 442, an advertisement is selected based on, at least in part, the comparison between the impression bids and effective impression values. Generally, an advertisement associated with a higher click bid or effective impression value is selected for display. At block 444, the selected advertisement is displayed via a computing device to a user, such as a webpage user.

Figure 5:
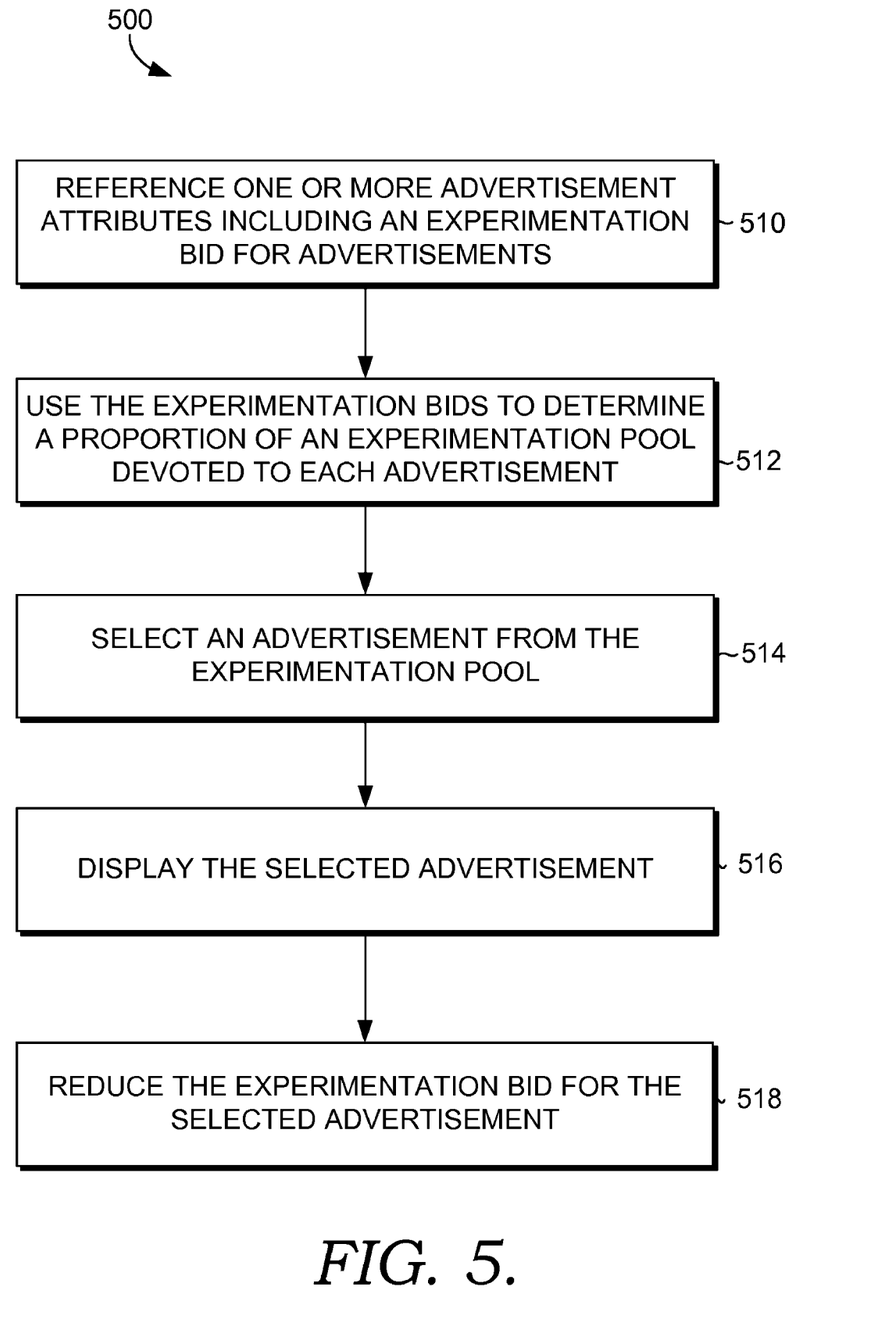
FIG. 5 is a flow diagram showing a method for facilitating advertisement selection using experimentation bids, in accordance with an embodiment of the present invention.

With reference to FIG. 5, a flow diagram is illustrated which shows a second method 500 for facilitating advertisement selection using experimentation bids, in accordance with an embodiment of the present invention. Initially, as indicated at block 510, one or more advertisement attributes, including an experimentation bid, for one or more advertisements within an experimentation pool are referenced. At block 512, the experimentation bids associated with the advertisements are used to determine a proportion of the experimentation pool (e.g., probability or representation quantity) that is devoted to each advertisement. At block 514, an advertisement is selected from the experimentation pool in accordance with the various proportions of the experimentation pool dedicated to the corresponding advertisement. At block 516, the selected advertisement is displayed to a user via a computing device. At block 518, the experimentation bid for the selected advertisement is reduced by a predetermined amount, such as an average impression cost.

Figure 6:
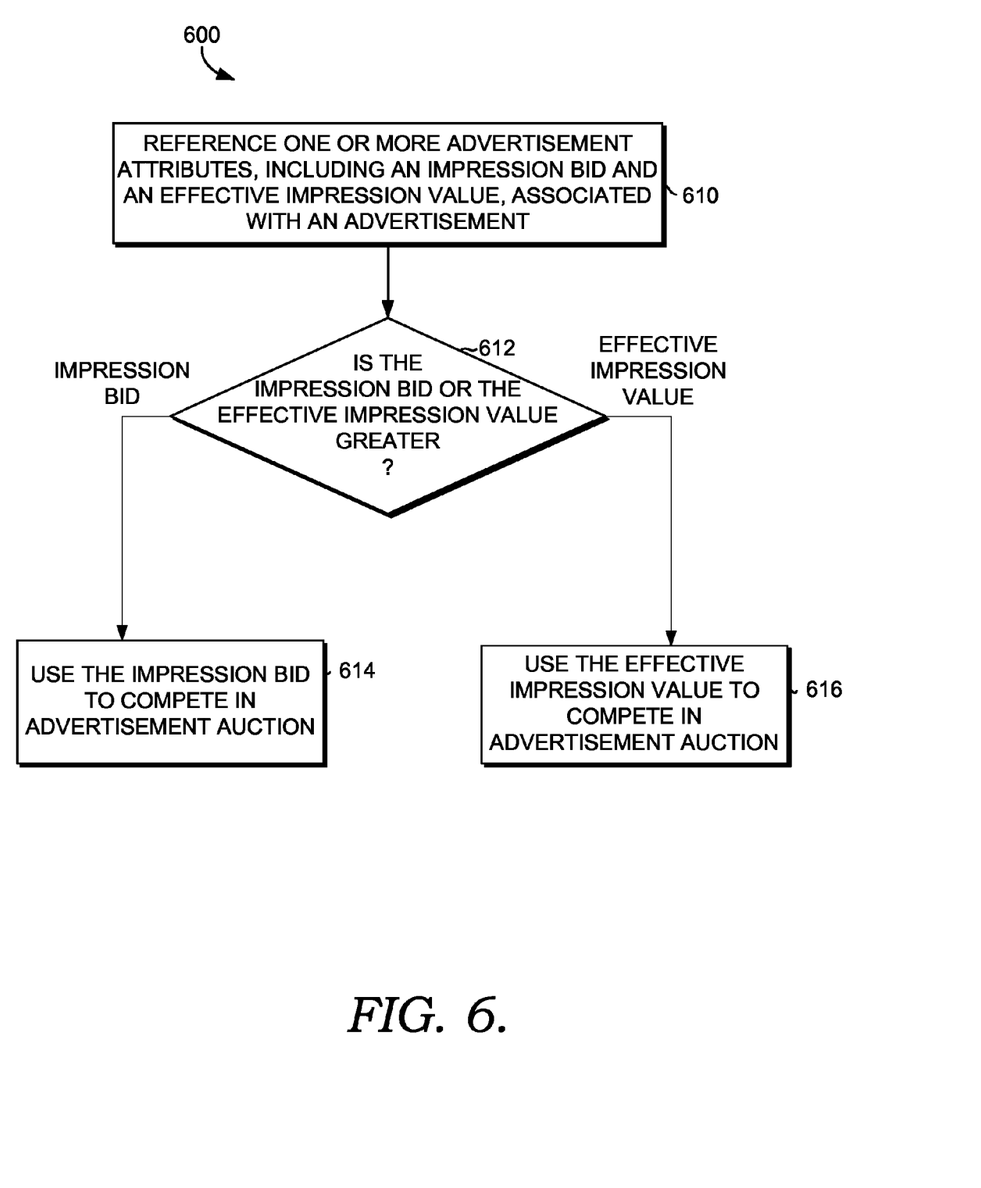
FIG. 6 is a flow diagram showing a method for facilitating advertisement selection using impression bids, in accordance with an embodiment of the present invention.

Turning now to method 600 of FIG. 6, a flow diagram is illustrated which shows a method 600 for facilitating advertisement selection using impression bids, in accordance with an embodiment of the present invention. Initially, as indicated at block 610, a set of one or more advertisement attributes, including an impression bid and an effective impression value, associated with an advertisement is referenced. At block 612, it is identified which of the impression bid or the effective impression value is greater. If it is determined that the impression bid is greater, the impression bid is utilized to compete in an advertisement auction to be selected for display. This is indicated at block 614. If, however, it is determined that the effective impression value is greater, the effective impression value is utilized to compete in an advertisement auction to be selected for display, as indicated at block 616. The impression bid or the effective impression value designated for use in the advertisement auction is compared to impression bids and effective impression values associated with other advertisements. Based on the comparison, an advertisement is selected for display to a user.

It will be understood by those of ordinary skill in the art that the order of steps shown in the method 400 of FIGS. 4A and 4B, the method 500 of FIG. 5, and the method 600 of FIG. 6 are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable hardware memory having computer-executable instructions embodied thereon, that when executed, cause a computing device to perform a method for facilitating advertisement selection using impression bids when satisfactory click rates are unavailable, the method comprising:
   referencing a set of one or more advertisement attributes in association with an advertisement, the set of advertisement attributes including at least an impression bid provided by an advertiser that indicates an acceptable amount to pay for one or more displays of the advertisement and a click bid provided by the advertiser that indicates an acceptable amount to pay for one or more user selections of the advertisement; and
   determining if a satisfactory click rate is available for the advertisement, wherein the satisfactory click rate is available when a frequency of advertisement impressions, a frequency of advertisement selections, a length of time during which advertisements are displayed, or a combination thereof exceeds a threshold, wherein
      if it is determined that the satisfactory click rate is unavailable for the advertisement, utilize the impression bid to compete with other advertisements in an advertisement-selection auction, and
      if it is determined that the satisfactory click rate is available for the advertisement, utilize the satisfactory click rate and the click bid to compete with the other advertisements in the advertisement-selection auction.

2. The memory of claim 1 further comprising receiving the click bid and the impression bid for the advertisement provided by the advertiser.

3. The memory of claim 1 further comprising determining that the advertisement should participate in the advertisement-selection auction.

4. The memory of claim 1, wherein the target threshold indicates a desired level of accuracy, or confidence thereof.

5. The memory of claim 1, wherein the utilized impression bid competes in the advertisement-selection auction against impression bids and effective impression values associated with other advertisements.

6. The memory of claim 1 further comprising determining an effective impression value for the advertisement using the satisfactory click rate and the click bid.

7. The memory of claim 6, wherein the effective impression value competes in the advertisement-selection auction against impression bids and effective impression values associated with other advertisements.

8. The memory of claim 7, wherein an advertisement associated with a highest of the impression bids and effective impression values is selected for display.

9. The memory of claim 1, wherein an advertisement-selection auction is an auction in which a plurality of advertisements compete to be selected for display to a user or set of users.

10. The memory of claim 9, wherein the plurality of advertisements compete using effective impression values and impression bids associated with the plurality of advertisements.

11. The memory of claim 1, wherein at least one of the set of advertisement attributes in association with the advertisement is used to determine the accuracy of the estimated click rate.

12. The memory of claim 1 further comprising selecting an advertisement for display to a user or a set of users.

13. One or more computer-readable hardware memory having computer-executable instructions embodied thereon, that when executed, cause a computing device to perform a method for facilitating advertisement selection using experimentation bids when satisfactory click rates are unavailable, the method comprising:

referencing a set of one or more advertisement attributes for each advertisement within an experimentation pool that includes only advertisements for which a satisfactory click rate is unavailable, the set of advertisement attributes including at least an experimentation bid provided by an advertiser that indicates an acceptable amount to pay for one or more displays of the advertisement;

for each advertisement, determining a probability that the advertisement will be selected from the experimentation pool to be displayed to one or more users based on the experimentation bid for the advertisement and a totality of experimentation bids provided for each advertisement within the experimentation pool; and selecting an advertisement for display, the advertisement for display being selected from the experimentation pool in accordance with the determined probabilities that the advertisement will be selected from the experimentation pool.

14. The memory of claim 13, wherein the experimentation pool comprises a plurality of advertisements for which satisfactory click rates are unavailable.

15. The memory of claim 13 further comprising presenting the selected advertisement to the one or more users.

16. The memory of claim 13, wherein the selected advertisement is presented in association with a set of search results.

17. The memory of claim 13 further comprising reducing the experimentation bid of the selected advertisement by a monetary amount.

18. The memory of claim 17, wherein the monetary amount is an average impression cost or a recent impression cost.

19. A computerized method for facilitating advertisement selection using advancement bids, the method comprising:

referencing a set of one or more advertisement attributes associated with an advertisement within an auction pool having advertisements associated with satisfactory click rates and advertisements associated with unsatisfactory click rates, the set of one or more advertisement attributes including an impression bid provided by an advertiser that indicates an acceptable amount to pay for one or more displays of the advertisement and an effective impression value that indicates a monetary value associated with a set of one or more impressions of the advertisement;

for the advertisement, determining if the impression bid or the effective impression value is greater, wherein
if the impression bid is greater, designating the impression bid for use in an advertisement-selection auction, and
if the effective impression value is greater, designating the effective impression value for use in the advertisement-selection auction;

comparing, via a computing device, the designated impression bid or the effective impression bid for the advertisement with impression bids and effective impression bids designated for other advertisements within the auction pool;

selecting one of the advertisements within the auction pool; and displaying the selected advertisement.

20. The computerized method of claim 19, further comprising selecting to use the auction pool to choose the advertisement to be presented to one or more users.

* * * * *